(No Model.)
C. F. DE REDON.
BRAKE FOR BICYCLES.
No. 581,304. Patented Apr. 27, 1897.
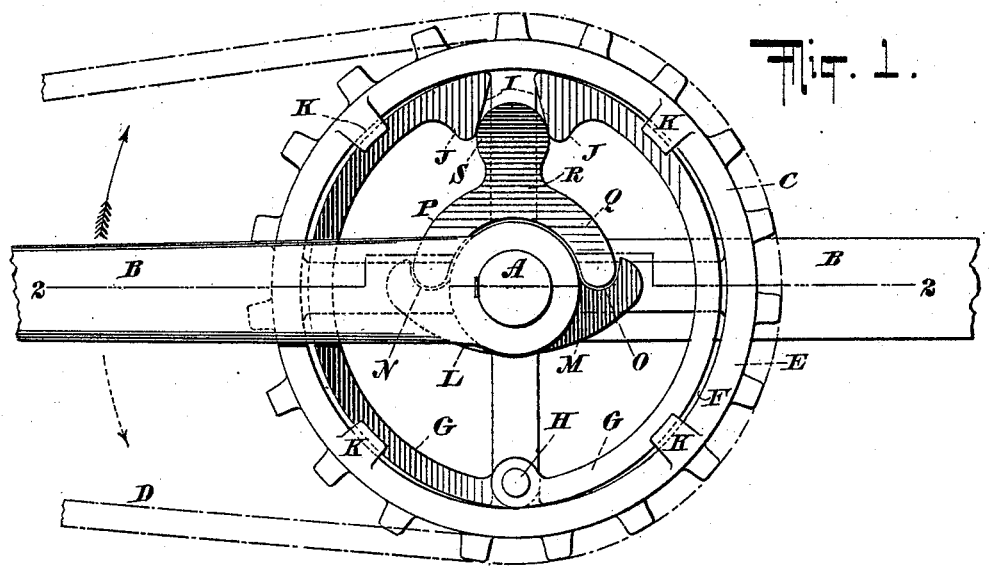
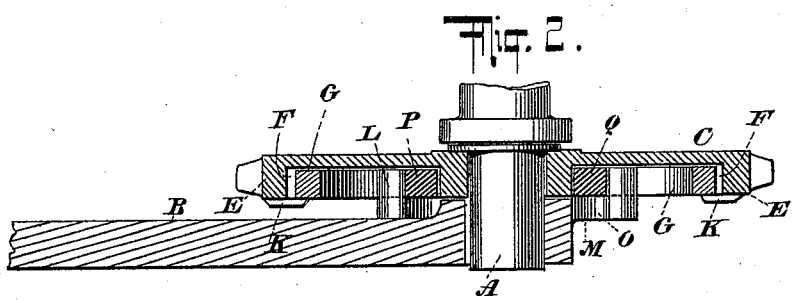
WITNESSES:
Gustave Dieterich
John Kehlenbeck
INVENTOR
Constant F. de Redon,
BY
Chas. E. Gill
ATTORNEY.
THE NORRIS PETERS CO., PHOTO-LITHO., WASHINGTON, D. C.

UNITED STATES PATENT OFFICE.

CONSTANT F. DE REDON, OF NEW YORK, N. Y., ASSIGNOR TO HENRY CHAURANT AND AUGUSTUS W. PETERS, OF SAME PLACE.

BRAKE FOR BICYCLES.

SPECIFICATION forming part of Letters Patent No. 581,304, dated April 27, 1897.

Application filed June 15, 1896. Serial No. 595,533. (No model.)

*To all whom it may concern:*

Be it known that I, CONSTANT F. DE REDON, a citizen of France, and a resident of New York, in the county of New York and State of New York, have invented certain new and useful Improvements in Brakes for Bicycles or other Vehicles, of which the following is a specification.

The invention relates to improvements in bicycles, and pertains particularly to a novel brake, as hereinafter described and claimed, operable from the crank-shaft under pressure applied in a reverse direction to the pedals and adapted to be applied to the sprocket-wheel on said shaft, said wheel being normally free upon the shaft. During the forward travel of the bicycle the action of the pedals and crank-shaft will, through the intermediate brake mechanism, rigidly connect the sprocket-wheel with said shaft, and hence the motion of said shaft will be transmitted through the sprocket-wheel and the usual chain to the sprocket-wheel on the rear axle of the bicycle. When it is desired to stop the wheel, the pedals will be arrested as nearly as may be when the pedal-arms are in a horizontal position, in order thereby to free the intermediate brake mechanism from the sprocket-wheel, leaving the latter free upon the crank-shaft, and thereupon the rider will exert a reverse pressure on the pedals, tending to turn the latter in a reverse direction, whereby with the proper gradual application of the pressure the brake mechanism will be caused to engage the sprocket-wheel and again connect it to a greater or less degree, according to the amount of pressure applied with the crank-shaft, whereby the wheel may be brought to a stop within such distance as the rider may desire, the absolute stoppage of the wheel being wholly under the control of the rider.

The invention will be more fully understood from the detailed description hereinafter presented, reference being had to the accompanying drawings, forming a part of this application, and in which—

Figure 1 is a side elevation, partly broken away, of that portion of the bicycle to which the brake mechanism constituting the present invention is directly applied; and Fig. 2 is a horizontal section of same on the dotted line 2 2 of Fig. 1.

In the accompanying drawings, A designates the usual crank-shaft, B B the pedal-arms connected with said shaft, and C the sprocket-wheel, which in the present instance is normally free upon the crank-shaft A and is in the usual manner connected by the sprocket-chain D with the usual sprocket-wheel on the rear axle. (Not shown.)

The sprocket-wheel C is formed with the rim E, whose inner surface forms an annular shoulder F to receive the brake spring or springs G. The spring or springs G may be formed in one or two pieces of metal, and in the present instance I have formed the same in two pieces of metal, pivotally connected at H. The two halves of the spring G comparatively snugly fit within the rim E of the sprocket-wheel, and at their separated ends are formed with the inclined surfaces I and heads J. The brake-spring G may be retained within the rim E of the sprocket-wheel by any suitable means, and in the present instance I have provided the retaining-lugs K for the purpose of preventing at any time the said spring from slipping away from the sprocket-wheel. The sprocket-wheel is normally loose upon the crank-shaft A, and the brake-spring G is normally loose within the rim E of said sprocket-wheel.

Upon the inner end of the pedal-arm B are formed the clutch-arms L M, which are provided with the pockets N O, adapted to receive the lower ends of the bifurcated arms P Q, formed on the wedge R, whose upper end is in the outline of a rounded head S, adapted to enter between the separated ends of the spring G and be firmly driven against the inclined surfaces I of said ends.

The arms L M correspond with and are in line with one another, and the arm L engages the wedge R and drives the head of the latter firmly between the separated ends of the spring G during the forward travel of the bicycle or when pressure is applied to the usual pedals for the purpose of driving the wheel forward. The arm M performs substantially no function during the forward travel of the bicycle, but comes into operative action when the motion of the pedal-arms is reversed for the purpose of stopping the wheel, and at such time when pressure is applied to drive the pedal-arm B downward in the direction of the arrow shown by dotted lines the arm $m$ will be forcibly pressed upward against the wedge R and drive the latter between the separated ends of the spring G.

When during the forward travel of the wheel the crank-arm B is moved in the direction of the arrow shown by full lines, the arm L drives the wedge R between the separated ends of the spring G, and this has the effect of forcing the two parts of the spring outward and causing the entire exterior surface of the spring to bind against the inner surface of the rim E, whereby the crank-shaft A and sprocket-wheel C become tied together and the motion of said shaft is communicated to the said wheel and the latter is caused to drive the chain D.

When it is desired to bring the bicycle to a stop, the rider will arrest the pedal-arms as nearly as may be in a horizontal position, as shown, and this will have the effect of releasing the pressure of the arm L against the wedge R and allowing the latter to free itself from its former rigid contact with the separated ends of the spring G, and at such time the spring G of its own resiliency will loosen the grip upon the walls of the rim E and the latter will be left free upon the shaft A. This condition of the parts remains practically momentary, since upon the arresting of the pedal-arms when in their horizontal position and the freeing of the spring G from the wheel C the rider will exert a reverse pressure upon the pedals for the purpose of giving the latter a movement in line with the arrow shown by dotted lines, the effect of which will be to drive the arm M upward against the wedge R and force the head of the latter between the separated ends of the spring G, whereby the said spring will again be forced outward and bind against the walls of the rim E for the purpose of connecting the wheel C with the crank-axle A. The reverse pressure applied to the pedal-arm D will be applied gradually, so as not to stop the wheel too suddenly, and the degree of pressure will be wholly under the control of the rider. Reverse pressure may be applied in such manner as to stop the wheel within any desired distance, in accordance with circumstances and the speed with which the wheel has been traveling.

What I claim as my invention, and desire to secure by Letters Patent, is—

1. In a brake mechanism, the power-shaft, the normally free driving-wheel thereon, and the crank-arm on said shaft for rotating the latter, combined with the spring within the rim of said wheel, and having separated ends, the wedge adapted to enter between said ends, and means operable from said crank-arm for driving said wedge between the ends of said spring during the forward motion of said arm and also during the reverse motion of same; substantially as set forth.

2. In a brake mechanism, the power-shaft, the normally free driving-wheel thereon, and the crank-arm on said shaft for rotating the latter, combined with the spring within the rim of said wheel, and having separated ends, the wedge adapted to enter between said ends and having the arms straddling said shaft, and the arms operable from said crank to engage during the forward and reverse movements of the latter the said arms of the wedge; substantially as set forth.

3. In a bicycle or other vehicle, the crank-shaft, the pedal-arms thereon, and the driving sprocket-wheel normally free on said shaft, combined with the spring within the rim of said wheel and normally free therefrom, and having separated ends, the wedge to enter between said ends, and means operable from the pedal-arm to force said wedge between said ends during the forward motion of said arm and also during the reverse motion of same; substantially as set forth.

4. In a bicycle or other vehicle, the crank-shaft, the pedal-arms thereon, and the driving sprocket-wheel normally free on said shaft, combined with the spring within the rim of said wheel and normally free therefrom and having separated ends, the wedge to enter between said ends and having the arms straddling the said shaft, and the arms operable from the pedal-arm to engage the arms of the wedge during the forward and reverse motions of said shaft; substantially as set forth.

Signed at New York, in the county of New York and State of New York, this 12th day of June, A. D. 1896.

CONSTANT F. DE REDON.

Witnesses:
CHAS. C. GILL,
E. JOS. BELKNAP.